US008989021B2

(12) United States Patent
Simon

(10) Patent No.: US 8,989,021 B2
(45) Date of Patent: Mar. 24, 2015

(54) UNIVERSAL BROADBAND BROADCASTING

(75) Inventor: Michael Simon, Frederick, MD (US)

(73) Assignee: Rohde & Schwarz GmbH & Co. KG, Munich (DE)

( * ) Notice: Subject to any disclaimer, the term of this patent is extended or adjusted under 35 U.S.C. 154(b) by 213 days.

(21) Appl. No.: 13/313,417

(22) Filed: Dec. 7, 2011

(65) Prior Publication Data

US 2012/0188878 A1 Jul. 26, 2012

Related U.S. Application Data

(60) Provisional application No. 61/434,466, filed on Jan. 20, 2011.

(51) Int. Cl.
| *H04L 1/00* | (2006.01) |
| *H04J 1/16* | (2006.01) |
| *G01R 31/08* | (2006.01) |
| *G06F 11/00* | (2006.01) |
| *G08C 15/00* | (2006.01) |
| *H04J 3/14* | (2006.01) |
| *H04L 12/26* | (2006.01) |
| *H04W 4/06* | (2009.01) |

(52) U.S. Cl.
CPC ..................................... *H04W 4/06* (2013.01)
USPC ........................................................ 370/241

(58) Field of Classification Search
CPC ....... H04W 72/00; H04W 36/00; H04W 4/26; H04W 16/14; H04W 24/00; G06F 15/16
See application file for complete search history.

(56) References Cited

U.S. PATENT DOCUMENTS

| 5,073,980 | A | * | 12/1991 | Prucnal et al. ................... 398/53 |
| 5,216,503 | A | | 6/1993 | Paik et al. |
| 5,506,844 | A | | 4/1996 | Rao |
| 5,614,914 | A | | 3/1997 | Bolgiano et al. |
| 5,835,493 | A | | 11/1998 | Magee et al. |
| 5,903,574 | A | | 5/1999 | Lyons |
| 5,966,120 | A | | 10/1999 | Arazi et al. |
| 6,005,605 | A | | 12/1999 | Kostreski et al. |
| 6,088,337 | A | | 7/2000 | Eastmond et al. |
| 6,118,797 | A | | 9/2000 | O'Shea ........................ 370/524 |

(Continued)

FOREIGN PATENT DOCUMENTS

| DE | 199 60 295 | 6/2001 |
| DE | 196 17 293 | 11/2001 |

(Continued)

OTHER PUBLICATIONS

Peha, J.M., "Sharing Spectrum Through Spectrum Policy Reform and Cognitive Radio," Proceedings of the IEEE , vol. 97, No. 4, pp. 708, 719, Apr. 2009, doi: 10.1109/JPROC.2009.2013033.*

(Continued)

*Primary Examiner* — Andrew Lai
*Assistant Examiner* — Hoyet H Andrews
(74) *Attorney, Agent, or Firm* — Fitzpatrick, Cella, Harper & Scinto

(57) ABSTRACT

A universal broadband broadcasting service is provided. A spectrum-sharing database stores attributes associated with a shared spectrum, a policy controller controls access to the shared spectrum by broadcast service entities, and a gateway receives IP multicast traffic from the broadcast service entities and communicates the IP multicast traffic to a broadcast single frequency network.

23 Claims, 9 Drawing Sheets

(56) References Cited

U.S. PATENT DOCUMENTS

| | | | |
|---|---|---|---|
| 6,130,898 A | 10/2000 | Kostreski et al. | |
| 6,192,070 B1 | 2/2001 | Poon et al. | |
| 6,269,092 B1 | 7/2001 | Schilling | |
| 6,313,885 B1 | 11/2001 | Patel et al. | |
| 6,324,186 B1 | 11/2001 | Mahn | |
| 6,335,766 B1 | 1/2002 | Twitchell et al. | |
| 6,414,720 B1 | 7/2002 | Tsukidate et al. | |
| 6,477,180 B1 | 11/2002 | Aggarwal et al. | |
| 6,480,236 B1 | 11/2002 | Limberg | |
| 6,496,477 B1 | 12/2002 | Perkins et al. | |
| 6,507,618 B1 | 1/2003 | Wee et al. | |
| 6,580,705 B1* | 6/2003 | Riazi et al. | 370/347 |
| 6,631,491 B1 | 10/2003 | Shibutani et al. | |
| 6,640,239 B1 | 10/2003 | Gidwani | |
| 6,678,260 B2* | 1/2004 | Proctor, Jr. | 370/335 |
| 6,717,933 B1* | 4/2004 | Sonning et al. | 370/342 |
| 6,721,337 B1 | 4/2004 | Kroeger et al. | |
| 6,727,847 B2 | 4/2004 | Rabinowitz et al. | |
| 6,728,467 B2 | 4/2004 | Oshima | |
| 6,744,789 B1 | 6/2004 | Michener | 370/509 |
| 6,772,434 B1 | 8/2004 | Godwin | |
| 6,801,499 B1 | 10/2004 | Anandakumar et al. | |
| 6,804,223 B2 | 10/2004 | Hoffmann et al. | |
| 6,816,204 B2 | 11/2004 | Limberg | |
| 6,861,964 B2 | 3/2005 | Breti et al. | |
| 6,862,707 B2 | 3/2005 | Shin | |
| 6,879,720 B2 | 4/2005 | Sarachik et al. | |
| 6,930,983 B2 | 8/2005 | Perkins et al. | |
| 6,934,312 B2 | 8/2005 | Takeuchi et al. | |
| 6,996,133 B2 | 2/2006 | Bretl et al. | |
| 7,110,048 B2 | 9/2006 | Weiss | |
| 7,111,221 B2 | 9/2006 | Birru et al. | |
| 7,197,685 B2 | 3/2007 | Limberg | |
| 7,310,354 B2 | 12/2007 | Fimoff et al. | |
| 7,324,545 B2 | 1/2008 | Chuah et al. | |
| 7,336,646 B2 | 2/2008 | Muller | |
| 7,349,675 B2 | 3/2008 | Karr et al. | |
| 7,382,838 B2 | 6/2008 | Peting | |
| 7,496,094 B2 | 2/2009 | Gopinath et al. | |
| 7,532,677 B2 | 5/2009 | Simon | |
| 7,532,857 B2 | 5/2009 | Simon | |
| 7,539,247 B2 | 5/2009 | Choi et al. | |
| 7,551,675 B2 | 6/2009 | Kroeger | |
| 7,554,912 B2 | 6/2009 | Rodriguez-Sanchez et al. | |
| 7,558,279 B2 | 7/2009 | Hwang et al. | |
| 7,564,905 B2 | 7/2009 | Park et al. | |
| 7,593,474 B2 | 9/2009 | Jeong et al. | |
| 7,599,348 B2 | 10/2009 | Kang et al. | |
| 7,602,749 B2* | 10/2009 | Proctor, Jr. | 370/335 |
| 7,626,960 B2* | 12/2009 | Muller | 370/328 |
| 7,667,780 B2 | 2/2010 | Weiss | |
| 7,668,250 B2 | 2/2010 | Limberg | |
| 7,672,399 B2 | 3/2010 | Simon | |
| 7,702,337 B2 | 4/2010 | Vare et al. | |
| 7,715,489 B2 | 5/2010 | Zeng | |
| 7,715,491 B2 | 5/2010 | Yu et al. | |
| 7,733,819 B2 | 6/2010 | Lee et al. | |
| 7,738,582 B2 | 6/2010 | Simon | |
| 7,773,684 B2 | 8/2010 | Jeong et al. | |
| 7,779,327 B2 | 8/2010 | Lee et al. | |
| 7,783,316 B1 | 8/2010 | Mitchell | |
| 7,801,181 B2 | 9/2010 | Song et al. | |
| 7,804,909 B2 | 9/2010 | Choi et al. | |
| 7,822,134 B2 | 10/2010 | Kim et al. | |
| 7,822,139 B2 | 10/2010 | Simon | |
| 7,830,974 B2 | 11/2010 | Choi et al. | |
| 7,852,961 B2 | 12/2010 | Chang et al. | |
| 7,856,590 B2 | 12/2010 | Kim et al. | |
| 7,890,047 B2 | 2/2011 | Kidd et al. | |
| 7,933,351 B2 | 4/2011 | Kim et al. | |
| 7,953,160 B2 | 5/2011 | Gordon et al. | |
| 8,009,662 B2 | 8/2011 | Lee et al. | |
| 8,228,791 B2* | 7/2012 | Bugenhagen et al. | 370/230 |
| 2001/0017849 A1 | 8/2001 | Campanella et al. | |
| 2002/0085548 A1 | 7/2002 | Ku et al. | |
| 2002/0170060 A1 | 11/2002 | Lyman | |
| 2003/0032389 A1* | 2/2003 | Kim et al. | 455/3.01 |
| 2003/0053493 A1 | 3/2003 | Graham Mobley et al. | |
| 2003/0099303 A1 | 5/2003 | Birru et al. | |
| 2003/0100267 A1 | 5/2003 | Itoh et al. | |
| 2003/0128826 A1* | 7/2003 | Benini et al. | 379/114.01 |
| 2003/0206596 A1 | 11/2003 | Carver et al. | |
| 2005/0013249 A1 | 1/2005 | Kong et al. | |
| 2005/0044475 A1 | 2/2005 | Yedidia et al. | |
| 2005/0046600 A1 | 3/2005 | Bretl et al. | |
| 2005/0084023 A1 | 4/2005 | Bott et al. | |
| 2005/0147186 A1 | 7/2005 | Funamoto et al. | |
| 2005/0207416 A1 | 9/2005 | Rajkotia | |
| 2005/0238100 A1 | 10/2005 | Hsiao et al. | |
| 2005/0249301 A1 | 11/2005 | Jeong et al. | |
| 2006/0002464 A1 | 1/2006 | Choi et al. | 375/240.01 |
| 2006/0023656 A1* | 2/2006 | Anglin, Jr. | 370/328 |
| 2006/0050770 A1 | 3/2006 | Wallace et al. | |
| 2006/0067266 A1* | 3/2006 | Ehlers et al. | 370/328 |
| 2006/0093045 A1 | 5/2006 | Anderson et al. | |
| 2006/0126556 A1 | 6/2006 | Jiang et al. | |
| 2006/0211436 A1 | 9/2006 | Paila et al. | |
| 2006/0245516 A1 | 11/2006 | Simon | |
| 2007/0066272 A1 | 3/2007 | Vassiliou et al. | |
| 2007/0074267 A1 | 3/2007 | Clerget et al. | |
| 2007/0091857 A1 | 4/2007 | Elstermann | |
| 2007/0143810 A1 | 6/2007 | Yousef | |
| 2007/0174880 A1 | 7/2007 | Fite et al. | |
| 2007/0230460 A1 | 10/2007 | Jeong et al. | |
| 2008/0056219 A1 | 3/2008 | Venkatachalam | |
| 2008/0175148 A1 | 7/2008 | Todd et al. | |
| 2008/0181112 A1 | 7/2008 | Beck et al. | |
| 2008/0205215 A1 | 8/2008 | Kikuchi et al. | |
| 2008/0209464 A1 | 8/2008 | Wright-Riley | |
| 2008/0211969 A1 | 9/2008 | Simon et al. | |
| 2008/0247442 A1 | 10/2008 | Orlik et al. | |
| 2008/0259835 A1 | 10/2008 | Venkatachalam et al. | |
| 2008/0273698 A1 | 11/2008 | Manders et al. | |
| 2009/0003432 A1 | 1/2009 | Liu et al. | |
| 2009/0013356 A1 | 1/2009 | Doerr et al. | |
| 2009/0016435 A1 | 1/2009 | Brandsma et al. | |
| 2009/0034442 A1 | 2/2009 | Song et al. | |
| 2009/0040962 A1 | 2/2009 | Oger et al. | |
| 2009/0100459 A1 | 4/2009 | Riedl et al. | |
| 2009/0193487 A1 | 7/2009 | Simon | |
| 2009/0201997 A1 | 8/2009 | Kim et al. | |
| 2009/0225872 A1 | 9/2009 | Simon | |
| 2009/0228764 A1 | 9/2009 | Lee et al. | |
| 2009/0228765 A1 | 9/2009 | Lee et al. | |
| 2009/0252266 A1 | 10/2009 | Heinemann et al. | |
| 2009/0265751 A1 | 10/2009 | Limberg | |
| 2009/0293086 A1 | 11/2009 | Lutterbach et al. | |
| 2010/0023972 A1 | 1/2010 | Summers et al. | |
| 2010/0142446 A1* | 6/2010 | Schlicht et al. | 370/328 |
| 2010/0142447 A1* | 6/2010 | Schlicht et al. | 370/328 |
| 2010/0150182 A1 | 6/2010 | Noronha, Jr. | |
| 2010/0246506 A1* | 9/2010 | Krishnaswamy | 370/329 |
| 2010/0254449 A1 | 10/2010 | Rusch-Ihwe | |
| 2011/0004912 A1 | 1/2011 | Teniou et al. | |
| 2011/0080972 A1 | 4/2011 | Xi et al. | |
| 2011/0170015 A1 | 7/2011 | Kim et al. | |
| 2011/0230202 A1 | 9/2011 | Wood et al. | |
| 2013/0182631 A1* | 7/2013 | Jamadagni et al. | 370/312 |

FOREIGN PATENT DOCUMENTS

| | | |
|---|---|---|
| DE | 101 12 773 A1 | 9/2002 |
| DE | 10 2006 015 393 | 10/2007 |
| DE | 10 2007 012 465 | 5/2008 |
| EP | 0 837 609 | 4/1998 |
| EP | 0 926 894 | 6/1999 |
| EP | 1 079 631 | 2/2001 |
| EP | 1 337 071 A2 | 8/2003 |
| EP | 1 670 150 | 6/2006 |
| EP | 1 753 249 | 2/2007 |
| EP | 1 950 962 | 7/2008 |
| EP | 1 965 386 A1 | 9/2008 |
| EP | 1 965 389 | 9/2008 |
| GB | 2 399 719 | 9/2004 |

(56) References Cited

FOREIGN PATENT DOCUMENTS

| WO | WO 02/03728 | 1/2002 |
|---|---|---|
| WO | WO 03/009590 | 1/2003 |
| WO | WO 03/045064 | 5/2003 |
| WO | 2004/062183 A1 | 7/2004 |
| WO | WO 2004/062283 | 7/2004 |
| WO | WO 2006/046107 | 5/2006 |
| WO | WO 2006/066617 | 6/2006 |
| WO | WO 2006/084361 | 8/2006 |
| WO | WO 2007/046672 | 4/2007 |
| WO | WO 2007/114653 | 10/2007 |
| WO | WO 2008/042694 | 4/2008 |
| WO | 2008/100000 A1 | 8/2008 |
| WO | 2008/117981 A1 | 10/2008 |
| WO | WO 2009/016175 | 2/2009 |
| WO | WO 2010/000407 | 1/2010 |
| WO | 2010/107699 A2 | 9/2010 |

OTHER PUBLICATIONS

Youping Zhao; Shiwen Mao; Reed, J.H.; Yingsong Huang, "Experimental study of utility function selection for video over IEEE 802.22 wireless regional area networks," Testbeds and Research Infrastructures for the Development of Networks & Communities and Workshops, 2009. TridentCom 2009. 5th International Conference on , vol., no., pp. 1, 10.*
Chih-Chao Wen; Cheng-Shong Wu; Ming-Ta Yang, "Hybrid Tree Based Explicit Routed Multicast for QoS Supported IPTV Service," Global Telecommunications Conference, 2009. GLOBECOM 2009. IEEE , vol., no., pp. 1, 6, Nov. 30, 2009-Dec. 4, 2009, doi: 10.1109/GLOCOM.2009.5425685.*
Jong Min Lee; Hyo-Jin Park; Seong-Gon Choi; Jun-kyun Choi, "Adaptive Hybrid Transmission Mechanism for On-Demand Mobile IPTV Over WiMAX," Broadcasting, IEEE Transactions on , vol. 55, No. 2, pp. 468, 477, Jun. 2009, doi: 10.1109/TBC.2009.2015605.*
Karimi, H.R.; Fenton, M.; Lapierre, G.; Fournier, E., "European Harmonized Technical Conditions and Band Plans for Broadband Wireless Access in the 790-862 MHz Digital Dividend Spectrum," New Frontiers in Dynamic Spectrum, 2010 IEEE Symposium on , vol., no., pp. 1, 9, Apr. 6-9, 2010, doi: 10.1109/DYSPAN.2010.5457848.*
Yucek, T.; Arslan, H., "A survey of spectrum sensing algorithms for cognitive radio applications," Communications Surveys & Tutorials, IEEE , vol. 11, No. 1, pp. 116, 130, First Quarter 2009 doi: 10.1109/SURV.2009.090109.*
Sachs, J.; Maric, I.; Goldsmith, A., "Cognitive Cellular Systems within the TV Spectrum," New Frontiers in Dynamic Spectrum, 2010 IEEE Symposium on , vol., No., pp. 1, 12, Apr. 6-9, 2010, doi: 10.1109/DYSPAN.2010.5457874.*
Youping Zhao; Shiwen Mao; Reed, J.H.; Yingsong Huang, "Experimental study of utility function selection for video over IEEE 802.22 wireless regional area networks," Testbeds and Research Infrastructures for the Development of Networks & Communities & Workshops, 2009. TridentCom 2009. 5th International Conference vol., no., pp. 1, 10, Apr. 6-8, 2009.*
Method and Apparatus for Providing Multi-Media Broadcast Multicast Services Data to User Equipments Over Relay Nodes 2910_CHE_2010.*
Youping Zhao; Shiwen Mao; Reed, J.H.; Yingsong Huang, "Experimental study of utility function selection for video over IEEE 802.22 wireless regional area networks," Test beds and Research Infrastructures and Workshops, 2009. TridentCom 2009. 5th International Conference on , vol., no., pp. 1, 10, Apr. 6-8, 2009, doi: 10.1109/TRIDENTCOM.2009.4976200.*
Jen-Wen Ding; Der-Jiunn Deng; Tin-Yu Wu; Hsiao-Hwa Chen, "Quality-aware bandwidth allocation for scalable on-demand streaming in wireless networks," Selected Areas in Communications, IEEE Journal on , vol. 28, No. 3, pp. 366, 376, Apr. 2010, doi: 10.1109/JSAC.2010.100408.*
Youping Zhao et al., titled, "Experimental study of utility function selection for video over IEEE 802.22 wireless regional area networks" , Test beds and Research Infrastructures for the Development of Networks & Communities and Workshops, 2009, TridentCom-2009. 5th International Conference on , vol., no., pp. 1, 10, Apr. 6-8, 2009.*
Jen-Wen Ding et al., titled, "Quality-aware bandwidth allocation for scalable on-demand streaming in wireless networks," Selected Areas in Communications, IEEE Journal on , vol. 28, No. 3, pp. 366, 376, Apr. 2010.*
Lee et al., "ATSC Terrestrial Digital Television Broadcasting Using Single Frequency Networks", XP-002556814, ETRI Journal, vol. 26, No. 2, Apr. 2004, pp. 92-100.
"ATSC Digital Television Standard (Annex D), RF/Transmission Systems Characteristics", Advanced Television Systems Committee, Sep. 16, 1995, pp. 46-60.
"ATSC Mobile DTV Standard, Part 2—RF/Transmission System Characteristics", Advanced Television Systems Committee, Inc., Document A/153 Part 2: 2009, Oct. 15, 2009, (88 pages).
ATSC Digital Television Standard (A/53), "Annex D: RF/Transmission Systems Characteristics", Sep. 16, 1995, pp. 46-60.
ATSC Digital Television Standard (A/53) Revision E, Advanced Television Systems Committee, Dec. 27, 2005.
"ATSC-Mobile DTV Standard, Part 3-Service Multiplex and Transport Subsystem Characteristics", Advanced Television Systems Committee, Inc., Document A/153 Part 3:2009, Oct. 15, 2009, pp. 14-25.
ATSC Recommended Practice: Design of Synchronized Multiple Transmitter Networks (A/111), Advanced Television Systems Committee, Sep. 3, 2004.
ATSC Standard: Synchronization Standard for Distributed Transmission (A/110), Advanced Television Systems Committee, Jul. 14, 2004.
ATSC Standard: Synchronization Standard for Distributed Transmission, Revision A (A/110A), Advanced Television Systems Committee, Jul. 19, 2005.
ATSC Standard: Synchronization Standard for Distributed Transmission, Revision B (A/110B), Advanced Television Systems Committee (Dec. 24, 2007).
ATSC Technology Group Report: DTV Signal Reception and Processing Considerations, Doc. T3-600r4, Advanced Television Systems Committee, Sep. 18, 2003.
Battisa, "Spectrally Efficient High Data Rate Waveforms for the UFO SATCOM Channel", Military Communications Conference, MILCOM 98, Proceedings, Oct. 18-21, 1998, pp. 134-139, IEEE vol. 1.
Citta, R., et al., "ATSC Transmission System: VSB Tutorial", Zenith Electronics Corporation, Symposium Handout, Montreuz Symposium, Jun. 12, 1997.
"Digital Video Broadcasting (DVB); DVB Mega-Frame for Single Frequency Network (SFN) Synchronization", European Broadcasting Union; eTSI TS 101 191 v1.4.1, Jun. 2004.
"European Broadcasting Union Union Europeenne de Radio-Television Digital Video Broadcasting (DVB); Specification for Service Information (SI) in DVB systems; ETS 300 468", ETSI Standards, Lis, Sophia Antipolis Cedex, France, vol. BC, Second Edition, Jan. 1, 1997, pp. 1-72.
Lecture 4: Digital Television the DVB transport stream, obtained from http://www.abo.fi/~jbjorkqv/digitv/lect4.pdf (last visited May 4, 2006).
Lee, Y., et al., "ATSC Terrestrial Digital Television Broadcasting Using Single Frequency Networks", ETRI Journal, Apr. 2004, pp. 92-100, vol. 26, No. 2.
Owen, H., "Proposed Modifications to ATSC Digital Television Standard to Improve Performance in the Face of Dynamic Multipath for Both Fixed and Mobile Operation", Sarnoff Corporation, Apr. 2, 2001.
Patel, C. B., et al., "Proposal to ATSC Subcommittee T3/S9 to Provide 8-VSB With a Repetitive-PN1023 Signal for Rapidly and Reliably Initializing Tracking in an Adaptive Equalizer Despite Adverse Multipath Conditions", Apr. 12, 2001.
Proposal for Enhancement of ATSC RF Transmission System (Revision to A/53), submitted by Samsung, Draft ver. 1.0, Sep. 16, 2004.
Raghunandan, K., "Satellite Digital Audio Radio Service (SDARS) System Architecture and Receiver Review", IEEE, Oct. 27, 2005.

(56) References Cited

OTHER PUBLICATIONS

"Universal Mobile Telecommunication Systems (UMTS); Introduction of the Multimedia Broadcast/Multicast Service (MBMS) in the Radio Access Network (Ran); Stage 2" (3GPP TS 25.346 version 7.4.0 Release 7); ETSI TS 125 346 No. V7.4.0 (Jun. 2007), IEEE, Lis, Sophia Antipolis Cedex, France, vol. 3-R2, No. V7.4.0, June.

Vogel, W. J., et al., "Propagation Effects and Satellite Radio Design", Paper No. 1445, Maastricht Exhibition and Congress Centre (MECC), Aug. 17-24, 2002.

Wang, "A New Implementation of Single Frequency Network Based on DMB-T", 2004 International Conference on Communications, Circuits and Systems (2004 ICCCAS), Jun. 27-29, 2004, pp. 246-249, vol. 1.

Wang, X., et al., "Transmitter Identification in Distributed Transmission Network and Its Applications in Position Location and a New Data Transmission Scheme", NAB Broadcast Engineering Conference, Apr. 16-21, 2005, pp. 511-520.

Whitaker, J. C., "Standard Handbook of Video and Television Engineering", Chapter 17.2 "ATSC DTV Received Systems", 2000, pp. 17-63 to 17-99.

ISR & WO—International Search Report and Written Opinion of the International Searching Authority, PCT/EP2011/072570.

"ATSC Digital Television Standard (A/53) Revision E with Amendment No. 1", Advanced Television Systems Committee, Apr. 18, 2006, pp. 45-91.

3GPP TS 25.211, "3rd Generation Partnership Project; Technical Specification Group Radio Access Network; Physical channels and mapping of transport channels onto physical channels (FDD) (Release 7)," V7.9.0, Dec. 2009.

International Search Report mailed Oct. 31, 2011 in International Application No. PCT/SE2011/051000.

Written Opinion mailed Oct. 31, 2011 in International Application No. PCT/SE2011/051000.

\* cited by examiner

UNIVERSAL BROADBAND BROADCASTING

CROSS REFERENCE TO RELATED APPLICATIONS

This application claims priority to, and the benefit of, U.S. Provisional Patent Application Ser. No. 61/434,466, filed Jan. 20, 2011, which is hereby incorporated by reference in its entirety.

BACKGROUND

I. Field

Example aspects of the present invention generally relate to telecommunications, and more particularly to a system architecture for broadcast spectrum-sharing.

II. Related Art

Since the beginning of broadcasting, the television (TV) broadcast spectrum has operated mostly under the same network topology. According to this topology, a single transmission antenna is used to radiate a high power signal toward the radio horizon to cover receivers within a predetermined coverage area. Roof mounted aerial antennas are used to receive the signals. FIG. 1 shows an example of such a broadcast topology 100.

As shown in FIG. 1, a single, relatively tall transmission tower 110 is fitted with a high power antenna having a vertical pattern signal which is tilted downward slightly. The slight vertical beam tilt directs the RF energy outwards (coverage contour 140), toward the radio horizon 120, over a relatively large coverage area 160. TV receivers with roof mounted antennas many miles from the transmission tower 110 are able to receive these broadcast signals.

Unavoidably, however, the signal continues to propagate outwards for approximately three times (3×) the coverage contour distance (X). This has the effect of creating an interference contour 150. As a result, TV channels on the same frequency (co-channels) must be placed at large geographic distances apart to prevent co-channel interference among stations in adjacent market areas. The channels are thus rendered unusable over an occupied region which includes the interference contour 150. Accordingly, by design, a large portion of the spectrum in a region must remain unused to mitigate co-channel interference. To deal with the constraints of this topology 100 regulatory rules and channel allocation methodologies have been enforced.

FIG. 2A illustrates two adjacent transmission channels, channel A (210A) and channel B (210B) serving the same market. As shown in FIG. 2A, the coverage contours 240A, 240B overlap, which can cause adjacent interference. Receiver 220 receives a strong signal from transmission channel B (210B), while attempting, typically with difficulty, to receive a weak signal from transmission channel A (210A).

FIG. 2B illustrates two co-channel transmission channels which are located further apart than the transmission channels illustrated in FIG. 2A. While the coverage contours 240A and 240B do not overlap, their respective interference contours 250A, 250B do. The relatively large distance between co-channels 225A and 225B prevents co-channel interference, but the use of the spectrum is still inefficient. The "white space" 230 is essentially unusable.

A typical broadcaster business focuses on using the above-described high power/high tower broadcast (point-to-multipoint) infrastructure to distribute content to the public over a broad area of coverage. Local television stations, for example, produce and distribute content such as news, weather, sports, traffic, community events/services, emergency information, etc., to their television market.

A typical 3GPP LTE Mobile Network Operator (MNO) focuses on optimizing its systems primarily for unicast (point-to-point) modes, with a primary design constraint being low latency. This permits latency-dependent applications such as voice over internet protocol (VoIP) and gaming to be best served.

3GPP Long Term Evolution (LTE) is a standard for wireless communication of high-speed data. One feature of LTE is called Multicast Broadcast Signal Frequency Network (MBSFN). MBSFN is capable of delivering broadcast (point-to-multipoint) and unicast (points-to-point) IP multimedia services using the LTE infrastructure.

BRIEF DESCRIPTION

The example embodiments described herein meet the above-identified needs by providing methods, systems and computer program products for providing broadband broadcast sharing. In one exemplary embodiment, a spectrum-sharing database stores attributes associated with a shared spectrum, a policy controller controls access to the shared spectrum by broadcast service entities, and a gateway receives IP multicast traffic from the broadcast service entities and communicates the IP multicast traffic to a broadcast single frequency network.

In another aspect, the policy controller controls access to the spectrum based on a service level agreement between the broadcast service entities. In another embodiment, the policy controller is in communication with a policy charging enforcement function entity, and controls access to the shared spectrum based on a request from the policy charging enforcement function entity to use a portion of the shared spectrum. In yet another embodiment, the policy controller stores instructions which when executed by a processor of the policy controller cause the policy controller to control access to the shared spectrum by the plurality of broadcast service entities.

In yet another aspect, the gateway aggregates the IP multicast traffic from the plurality of broadcast service entities to generate an aggregated IP multicast stream, and inserts timing information into the aggregated IP multicast stream to cause modulators in a broadcast single frequency network to become synchronized.

In another embodiment, the policy controller controls access to the spectrum based on a predetermined policy and/or government regulation.

In another aspect, the attributes stored in the spectrum-sharing database include one or more frequency bands over one or more geographical areas and transmission parameters corresponding to the geographical area(s).

An on-line charging unit is provided in yet another embodiment, which is in communication with the policy controller and capable of monitoring usage of the shared spectrum by at least one broadcast service entity and to communicate the usage to a billing system.

In yet another embodiment, the gateway performs deep packet inspection and monitors the IP multicast traffic from each broadcast service entity and communicates corresponding usage data to the policy controller, which in turn communicates with an on-line charging entity.

The spectrum-sharing database can also store frequency re-use data over a geographic area and wherein the policy controller mitigates inter-market interference by using the frequency re-use data. The frequency re-use data can include frequency bands corresponding to respective geographic areas, which when processed by the policy controller, controls the allocation of frequency use between geographic areas.

Broadcast service entities can include at least one of mobile broadcast service entities and fixed broadcast service entities. Broadcast service entities can also include a local DTV station.

In another aspect, the mobile broadcast service entities use Orthogonal Frequency Division Multiple Access (OFDMA) optimized for mobile service spectrum efficiency and the fixed broadcast service entities use Orthogonal Frequency Division Multiplexing (OFDM) optimized for fixed service spectrum efficiency.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

Aspects of the embodiments described herein envisage harmonization of a digital TV broadcast and LTE mobile network technologies to enable converged broadcast broadband services. This allows for more effective shared use of the broadcast spectrum and infrastructure to match the distribution needs for broadcast traffic by a diverse set of broadcast service entities. One technical challenge involves providing the ability to off-load broadcast traffic from MNO LTE wireless networks to ease network congestion. Another technical challenge involves controlling and monitoring a shared broadcast spectrum.

Figure 1:
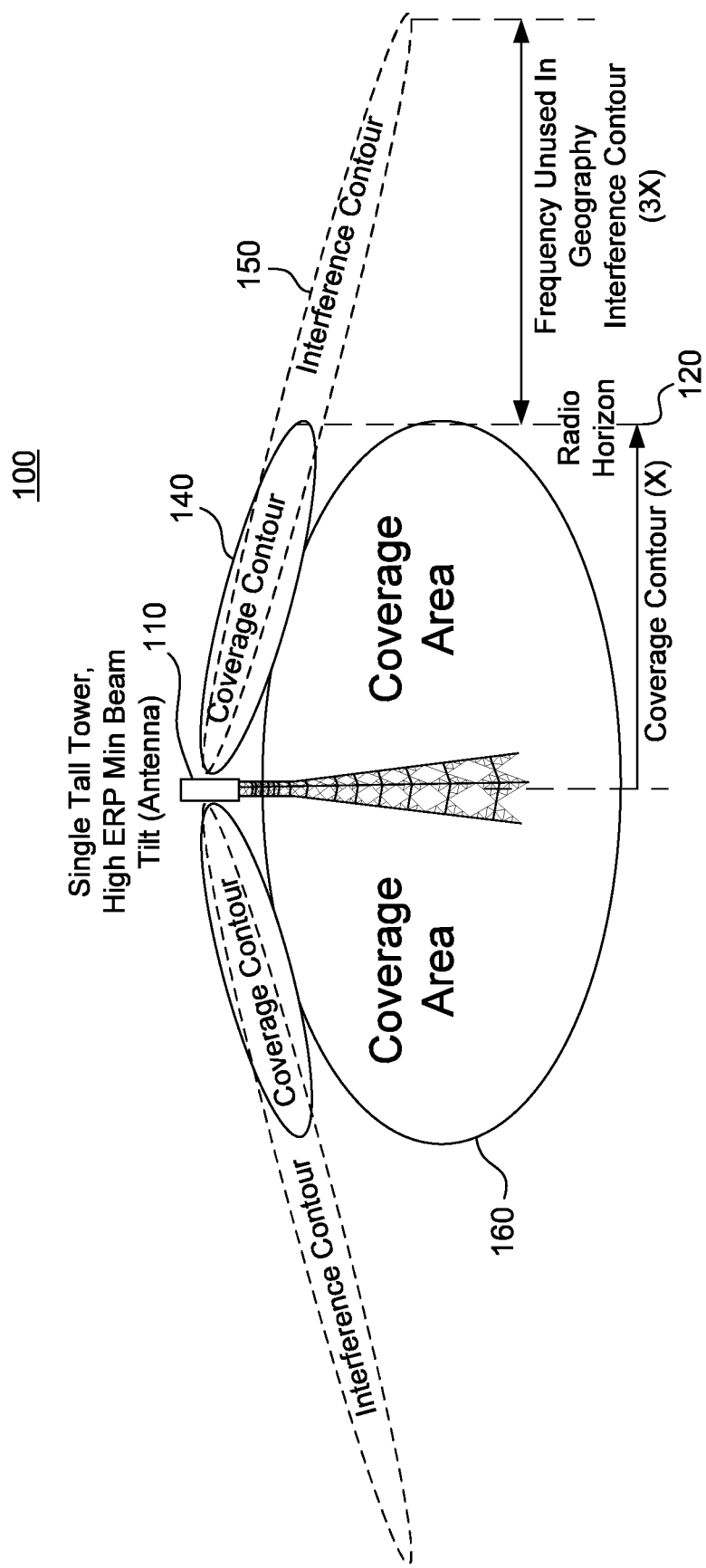
FIG. 1 shows a prior art broadcast topology.
Figure 2A:
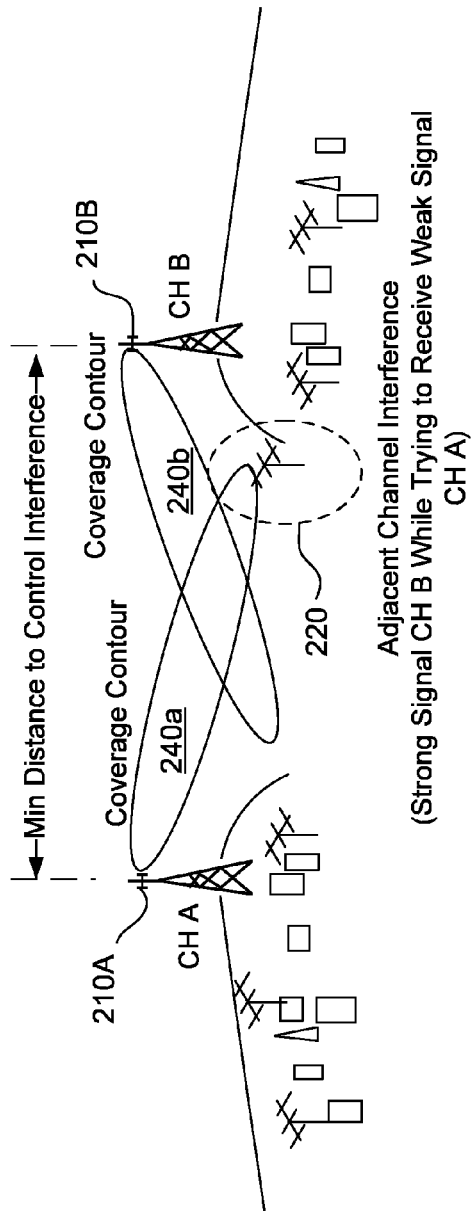
FIG. 2A illustrates two adjacent transmission channels positioned to minimize adjacent channel interference.
Figure 2B:
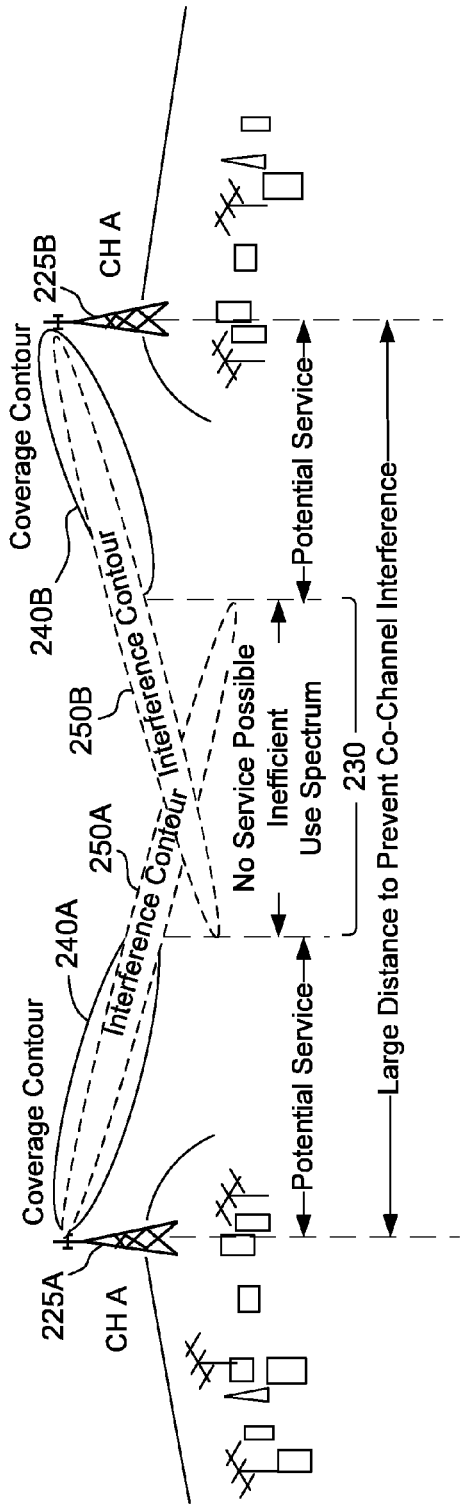
FIG. 2B illustrates two co-channel transmission channels positioned so as to be far enough apart so as to not suffer from co-channel interference but result in an unallocated area.
Figure 3:
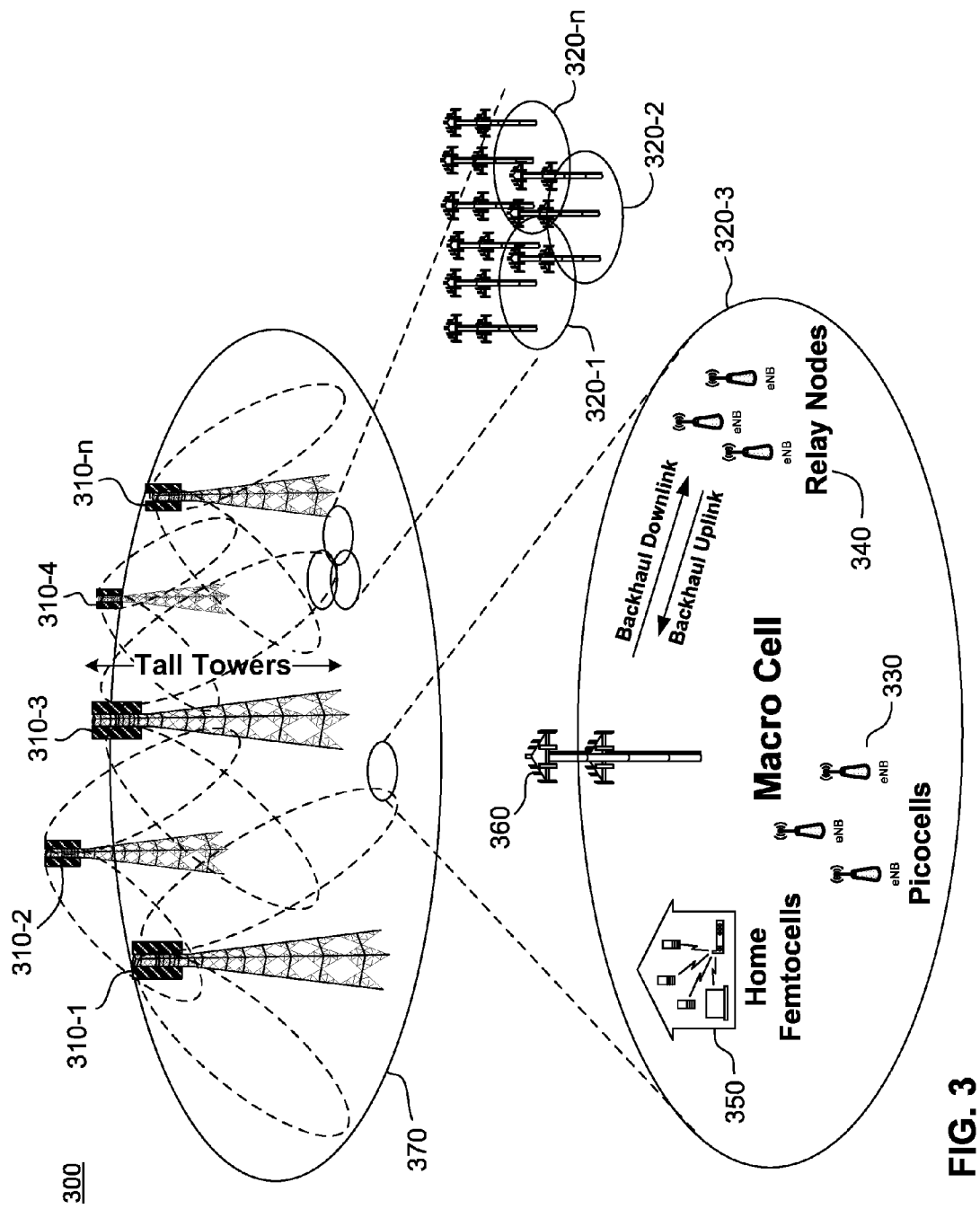
FIG. 3 is a broadcast topology for broadband service in accordance with an exemplary embodiment of the present invention.

FIG. 3 illustrates a broadcast topology 300 for providing broadband and broadcast service in accordance with an exemplary embodiment. Generally, broadcast topology 300 can be considered part of a heterogeneous network (HetNet) capable of complementing an LTE mobile network 320-1, 320-2, 320-3, . . . , 320-$n$ of a wireless carrier to provide efficient distribution of broadcast content over a wide area. The broadcast topology uses multiple transmit antennas 310-1, 310-2, 310-3, . . . , 310-$n$, with a vertical beam tilt that is more aggressive so as to contain the distance of an emitted signal and enable a much higher signal strength down on the ground. (i.e., much closer to the towers to enable broadcast service) while minimizing the interference contour created. The transmitters (not shown) transmit symbols coherently via transmit antennas 310-1, 310-2, 310-3, . . . , 310-$n$ forming a single frequency network (SFN) topology As will be described in more detail below with respect to FIG. 4 (A,B,C), this network topology can also receive mobile network high demand and high bandwidth content (e.g., video, news, application updates, etc.) which can be delivered to a large number of users over a wide area using a (point-to-multipoint) broadcast mode. The broadcast topology 300 also provides a minimal co-channel interference zone between adjacent markets (not shown) due to the relatively smaller coverage contours resulting from directing the signal energy downwards instead of outwards towards the radio horizon.

Broadcast topology 300 provides broadcast (point-to-multipoint) distribution and forms a so-called "broadcast overlay" 370 using tall towers and the high power can interwork (e.g., accept broadcast traffic) from the mobile network 320-1, 320-2, 320-3, . . . , 320-$n$. The shared broadcast overlay 370 can be operated in, for example, the 500-600 MHz UHF broadcast band, and be harmonized with MNO networks, such as the 3GPP LTE and its Evolved Packet Core (EPC), enabling a converged universal broadcast capability. Broadcast topology 300 also allows broadcast television and wireless operators to provide complimentary "shared" services and infrastructure. The UHF broadcast spectrum's inherent propagation characteristics are used to deliver broadcast services more efficiently than the higher frequency bands generally used by wireless MNOs.

Referring still to FIG. 3, mobile network 320-1, 320-2, 320-3, . . . , 320-$n$ can include hundreds of macro cells 360 arranged, for example, to cover a major city and its surrounding areas. In an LTE environment, for example, some of these cells can provide MBSFN (mixed) broadcast and unicast services over a small area.

In a typical cellular HetNet environment, a macro base station 360 can be a high power node supported by other lower power distributed nodes. Low power nodes, such as picocells 330, are used to increase capacity by creating what are commonly referred to as "Hot Spots" in small areas. Relay nodes 340 are used for coverage extension, and femtocells 350 can be used to off-load traffic to a WLAN inside of, for example, a home.

One aspect of the exemplary embodiments described herein is that the broadcast overlay 370 can be viewed as a high power entity which provides efficient broadcast services and can offer the capability to off-load broadcast traffic from the low power macro cells over a wide area outside of the home by interworking with EPC and IP networks. For example, to increase unicast capacity, a small low power HetNet can be used, and for common broadcast content a large-cell high-power broadcast overlay can be used.

In one embodiment, the high height of a transmit antenna is used to deliver broadcast services. Using such high height antenna structures with optimized patterns (including downward vertical beam tilt and high power) mitigates urban shadowing and provides high SNR over a large area, a prerequisite for acceptable broadcast quality of service (QOS). The architecture also benefits from SFN gain in reception areas with overlapping coherent signals. These features result in a high probability of an efficient broadcast service over a wide urban area. In yet another embodiment, high power broadband broadcast antenna structures with adjustable vertical beam tilt capability can be used to bring additional degrees of freedom to optimize broadcast overlay network, for example the frequency re-use at market edges between cities.

Figure 4A:
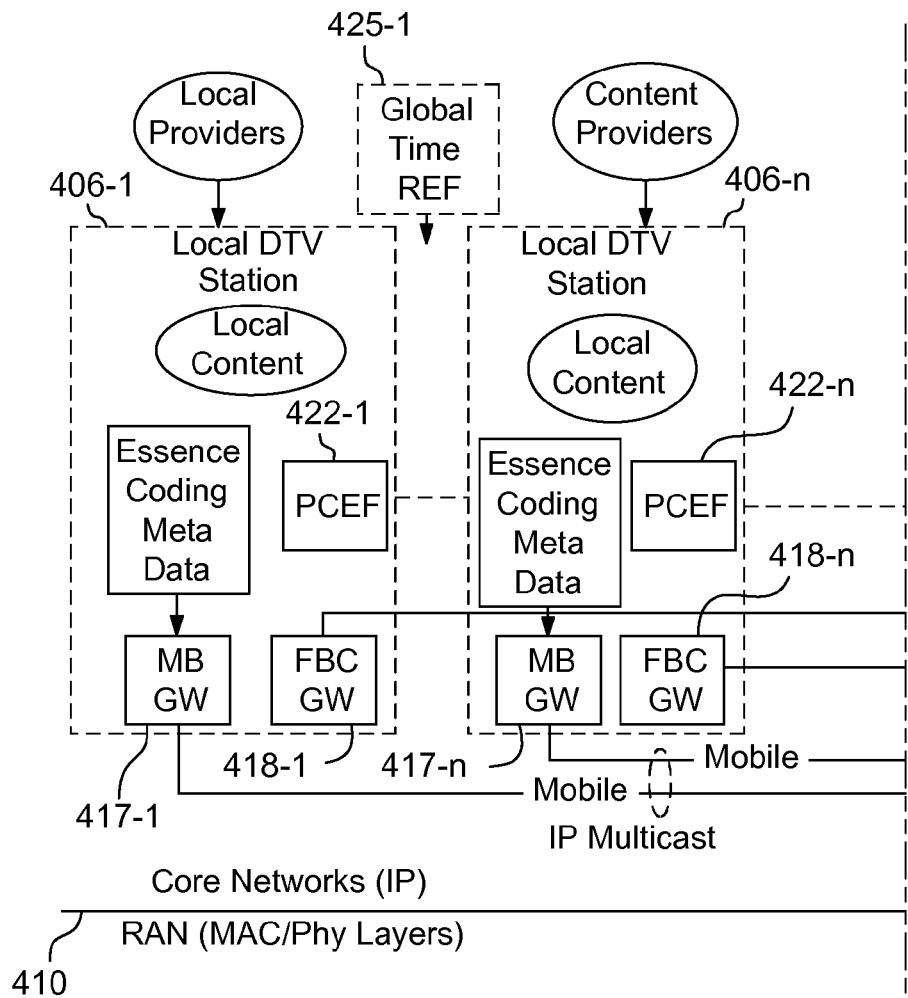
FIGS. 4A-4C illustrate a broadcast architecture in accordance with an exemplary embodiment of the present invention.
Figure 4B:
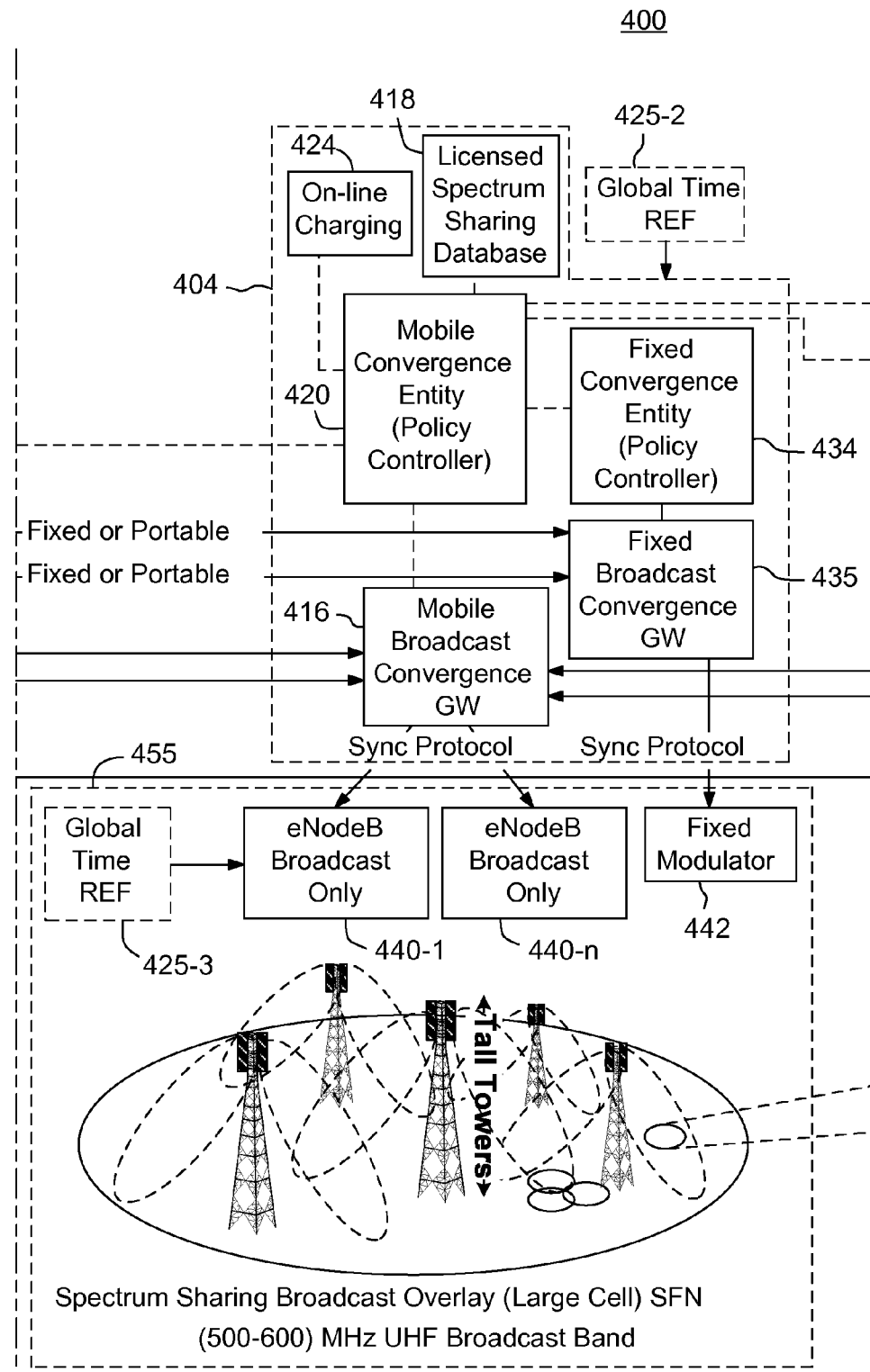
Figure 4C:
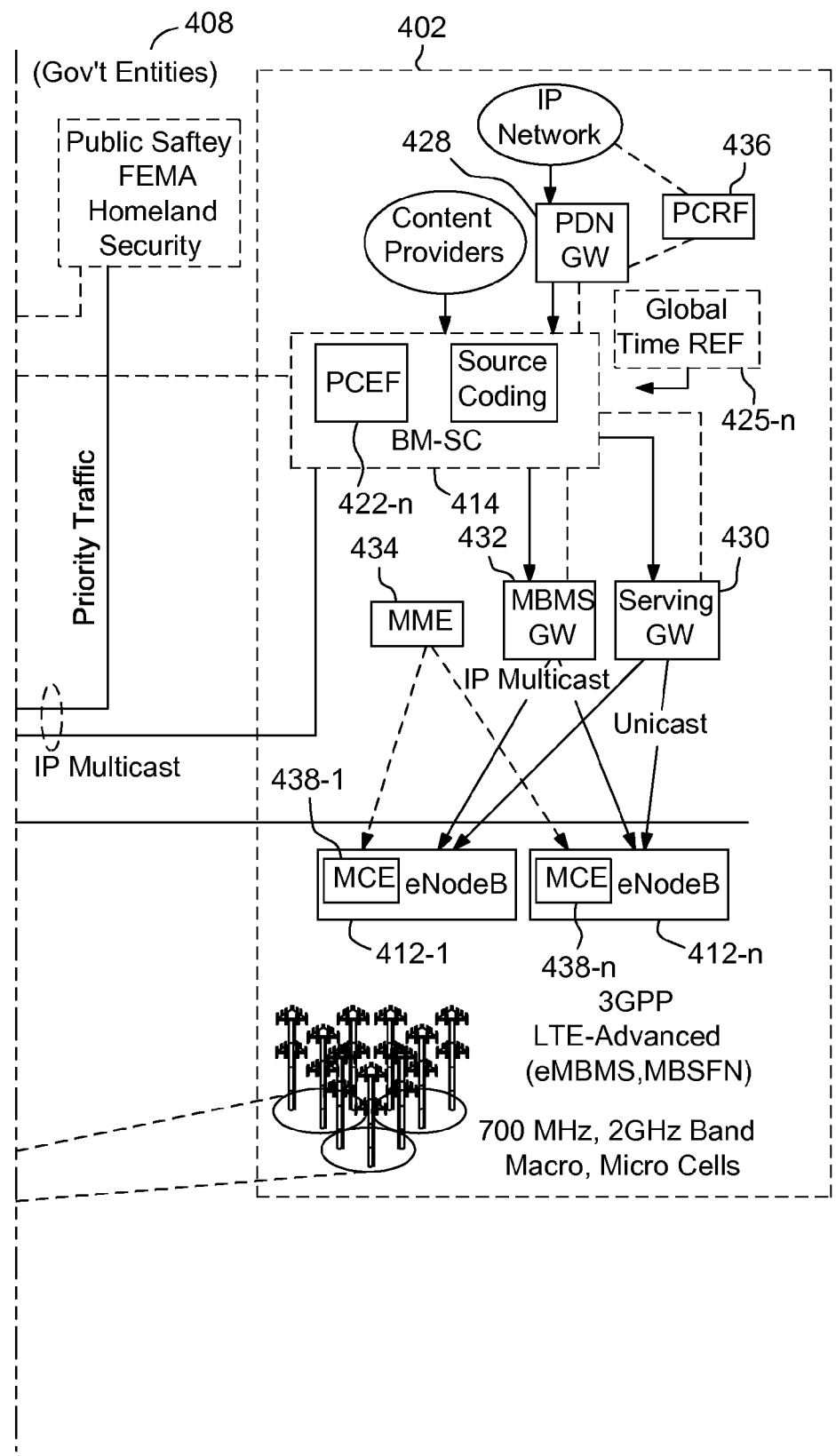

FIGS. 4A-4C illustrate a broadcast architecture 400 in accordance with an exemplary embodiment of the present invention. Generally, broadcast architecture 400 integrates broadcast and mobile networks (e.g., 3GPP LTE) so as to operate under a shared broadcast spectrum bandwidth. As shown in FIG. 4, three main regions have been segmented: (1) MNO (LTE/EPC) network 402, (2) broadcast overlay core network 404; and (3) broadcast networks 406-1, . . . , 406-n. The UHF television broadcast spectrum under this architecture provides a general broadcast capability which serves the broadcast transport needs of these diverse broadcast service entities. In one exemplary embodiment, broadcast networks 406-1, . . . , 406-n are local DTV stations and MNO (LTE/EPC) networks 402, also referred to as a mobile broadcast service entities, are mobile IP service providers that use Orthogonal Frequency Division Multiple Access (OFDMA). Such broadcast service entities can be extended to include designated government entities 408 such as public safety agencies (e.g., FEMA, Homeland Security, etc.) and fixed broadcast service entities that use, for example, Orthogonal Frequency Division Multiplexing (OFDM).

Horizontal demarcation line 410 shows a boundary between upper IP core networks and the lower radio access network or "RAN" (MAC/Physical) layers. According to one aspect, core IP network architecture (above line 410) leverages existing technology and functionality used in an MNO system 402, which in this exemplary embodiment is a 3GPP LTE/EPC network. Other types of MNO systems can be used and still be within the scope of this exemplary embodiment. The MNO (LTE/EPC) network 402 delivers both normal unicast and IP multicast (broadcast) services through base station and transmitters 412-1, . . . , 412-n (e.g., a 3GPP LTE Base Station/Transmitter). In addition, the IP multicast traffic (broadcast) can be off-loaded from an MNO by communicating IP multicast services from a broadcast multicast service center (BM-SC) 414 to the broadcast overlay core network 404 and through a mobile broadcast convergence gateway (MB-CG) 416.

Broadcaster networks 406-1, . . . , 406-n (e.g., local DTV stations) can also deliver IP multicast traffic to broadcast overlay core network 404 through MB-CG 416 from their respective mobile broadcast gateways (MB-GW) 417-1, . . . , 417-n. MB-CG 416, in turn, aggregates the IP multicast streams from the broadcast networks 406-1, . . . , 406-n and MNO network 402, and inserts signaling and timing information into the aggregated IP multicast stream.

The broadcast overlay RAN (MAC/Physical) layers (i.e., below demarcation line 410) receive synchronized aggregated traffic from MB-CG 416 with embedded signaling and timing (e.g., sync protocol) so that each broadcast-only modulator (or base station), eNodeB 440-1, . . . , 440-n, slaves to the timing information in incoming streams and assigns (via signaling) the same physical layer resource blocks using identical channel coding parameters in a physical layer frame. This causes the packets of the broadcast traffic to be transformed into coherent orthogonal frequency-division multiple access (OFDMA) symbols, which in turn are used for SFN operation. Global time references 425-1, 425-2, 425-3, . . . , 425-n are used throughout architecture 400 to provide a common timebase. In one example embodiment, global time references 425-1, 425-2, 425-3, . . . , 425-n are realized by a 1 Network Time Protocol (NTP) server.

A spectrum-sharing database 418 is used to store attributes associated with a shared spectrum. The attributes stored in the spectrum-sharing database 418 can include, for example, frequency bands including OFDMA sub-carriers for use at each 440-N, 442 modulators at specific geographical areas and with corresponding transmission site and propagation parameters.

A mobile policy controller 420 is used to control access to the shared spectrum by broadcast service entities. Mobile policy controller 420 stores or is in connection with a database storing the shared spectrum capacity (e.g., potential data rate supported) and controls access to the spectrum (e.g., amount of data per unit of time) based on a service level agreement or other contract between the broadcast service entities 406-1, . . . , 406-n, 402. This can be accomplished by storing instructions corresponding to the service level agreement in a memory, which when executed by a processor of the policy controller 420 cause the policy controller to control access to the shared spectrum by the broadcast service entities.

In one embodiment, policy controller 420 communicates with a policy charging enforcement function entities (PCEF) 422-1, 422-2, . . . , 422-n (individually simply referred to as 422) located for example in the LTE MNO network 402 or television broadcast network 406-1, . . . , 406-n. Mobile policy controller 420 controls access to the shared spectrum based on a request from a PCEF 422 to use a portion of the shared spectrum. In another embodiment, mobile policy controller 420 controls access to the spectrum based on at least one of a predetermined policy and government regulation.

In another example aspect, spectrum-sharing database 418 is used to store frequency re-use data. Policy controller 420 mitigates inter-market interference by using the frequency re-use data. The frequency re-use data can be, for example, frequency bands and OFDMA sub-carriers corresponding to parameters for use in modulators 440-1, 440-n in respective site geographic areas, which are in turn processed by the policy controller 420 to control the allocation of frequency use between geographic areas to increase service or mitigate inter-site interference.

Mobile broadcast convergence gateway (MB-CG or "gateway") 416 receives IP multicast traffic from the broadcast service entities and communicates the IP multicast traffic to a broadcast single frequency network 455. MB-CG 416 aggregates the IP multicast traffic from the plurality of broadcast service entities to generate an aggregated IP multicast stream. MB-CG 416 also inserts timing and signaling information into the aggregated IP multicast stream to cause modulators, 440-1, . . . 440-n, in a broadcast single frequency network to become synchronized.

MG-CG 416 can also be used to perform deep packet inspection to monitor the IP multicast traffic from each of the broadcast service entities and communicate corresponding usage data to the policy controller 420, which in turn communicates to on-line charging entity 424.

An on-line charging unit 424 may also be utilized to communicate information needed by billing systems to manage charges (e.g., invoice) associated with the usage of the shared spectrum by the broadcast service entities. Specifically, on-line charging unit 424 provides appropriate interfaces for billing and charging, allowing for the development of new business models and service offerings. For example, on-line charging unit 424 provides a mechanism for charging which enables spectrum-sharing business models (service level agreements) between entities, and mechanisms to enable revenue streams to entities (e.g., federal government based on rules established for shared use of spectrum). The revenue streams can be enforced, for example, by metering network data flows via deep packet inspection at defined interfaces in network as described above.

Fixed broadcast services share the broadband broadcast spectrum in a similar manner. Particularly, fixed convergence entity (policy controller) 434 operates in substantially the same manner as mobile convergence entity (policy controller) 420, fixed broadcast convergence gateway 435 operates in substantially the same manner as mobile broadcast convergence gateway 416 and fixed modulator 442 operates in substantially the same manner as modulators 440-1, ..., 440-n. The primary difference is that the fixed layer RAN for the fixed service is optimized for fixed services and thus uses a fixed-OFDM layer instead of a mobile-OFDM layer.

A description of the EPC in accordance with an exemplary embodiment will now be described in more detail. By way of background, prior mobile network architectures were designed primarily for providing one application—voice—in a circuit-switched domain. Mobile network architectures evolved to provide data in a separate packet domain. Present day mobile network architectures, such as 3GPP LTE/EPC systems, provide all mobile services—voice, data, video over IP with so-called "bearers" to support a specific end-to-end QoS (quality of service). In the exemplary MNO (LTE/EPC) network 402 shown in FIG. 4, are some of the basic EPC elements or network nodes:

Packet Data Network Gateway (PDN-GW) 428
Serving Gateway (S-GW) 430
Multimedia Broadcast Multicast Service Gateway (MBMS-GW) 432
Mobility Management Entity (MME) 434
Broadcast Multicast Service Center (BM-SC) 414
Policy and Charging Rules Function (PCRF) 436

PDN-GW 428 is responsible for IP address allocation for user equipment (UE) in unicast mode, is the anchor point for sessions towards external IP networks such as the internet, and contains software instructions (rules) executed by a processor to support policy enforcement, packet filtering and charging. User data is carried over virtual containers called service data flows (SDF) which, in turn, are mapped onto bearers that can provide each SDF a unique quality of service (QoS).

S-GW 430 is used for unicast data bearer traffic between the core networks and RAN (or MAC/Physical layers). S-GW 430 is also the mobility anchor point between base stations during a coordinated hand-off.

MBMS-GW 432 is the termination point for the core network for IP multicast (broadcast) traffic towards the RAN. Conventional LTE provides only a mixed-mode consisting of both unicast traffic (S-GW 430) and IP Multicast (MBMS-GW 432) broadcast traffic, time division multiplexed on an LTE sub-frame basis.

When two or more LTE cells in mixed-mode carry common broadcast traffic and are synchronized so as to produce coherent symbols, this is termed a Multicast Broadcast Single Frequency Network (MBSFN). This mode can be provisioned using up to 6 of 10 sub-frames comprising an LTE frame for broadcast (point-to-multipoint) service and the remainder of sub-frames as normal unicast (point-to-point) services.

MME 434 is the main control plane node which provides signaling and control functions to user equipment (UE) and manages access to network connections. MME 434 further controls assignment of resources and mobility tracking etc., and provides all control plane functions for session management.

BM-SC 414 provides authorization and authentication to external content providers and overall configuration of user data flows through the core network, including timing of MBSFN content with "Sync Protocol" and, working with the a Multimedia Broadcast Multicast Service Coordination Entity (MCE 438-1, ..., 438-n) ensures mapping of content onto identical physical layer resources at each eNodeB 412-1, ..., 412-n (e.g., base station) to produce coherent symbols for the MB SFN.

PCRF 436 stores instructions in a memory, which when executed by a processor, act as the policy, charging and rules for the 3GPP network. Generally, it is the entity that supports data flow detection, policy enforcement and flow-based charging to facilitate flexible business models and access to non-3GPP networks such as WiFi/WLAN.

LTE cells can be in MBSFN mode such that a UE (user equipment) receives multiple synchronized signals from cells and the delay spread of a received signal is smaller than an orthogonal frequency division modulation (OFDM) symbol cyclic pre-fix. SFN brings the additional attributes of diversity gain as well as higher signal levels through SFN gain (combining symbols constructively). The cyclic pre-fix length of, for example, ~5 μs (5.2 or 4.7) and/or 16.7 μs allow cells sites to be placed at an inter-site distance of 1 and 3 miles apart, respectively, given a rough estimate that radio waves propagate ~1 mile every 5 μs. Hence, if a broadcast capability is needed (e.g., users want to consume common content) over a wide area, many such cells would have to be synchronized. Also, the (mixed) MBSFN mode requires an MNO to give up unicast capacity to get broadcast capacity.

The 3GPP LTE orthogonal frequency division modulation access (OFDMA) system supports scalable bandwidths: 1.4, 3, 5, 10, 15, and 20 MHz, corresponding to different number of resource blocks, where a resource block (RB) is defined as 7 or 6 consecutive OFDM symbols in the time domain depending on the cyclic prefix length and 12 consecutive sub-carriers (180 kHz) in the frequency domain. One or more resource blocks can be allocated to a terminal (UE) for data transmission and reception.

One aspect of the embodiments described herein includes the provision of an LTE broadcast extensions to enable the larger inter-site distances to support the large cell SFN broadcast overlay for the 500 MHz-600 MHz UHF band. An LTE network uses a fixed sub-carrier spacing of 15 kHz, independent of frequency bands used, which was a design compromise to cover the higher frequency bands supported by LTE including frequencies greater than 3 GHz. This relatively large, fixed 15 kHz spacing ensures the system will have adequate Doppler (high speed) performance in high frequency bands. In OFDM systems such as LTE, the sub-carrier spacing is inversely proportional to the symbol length and cyclic prefix.

In one aspect, the LTE broadcast extension is optimized for the 500-600 MHz band with a reduction in sub-carrier spacing to enable a longer symbol length and corresponding cyclic prefix to support larger inter-site distances while still maintaining adequate Doppler performance with a reduced sub-carrier spacing. The OFDM carrier spacing can be reduced and the FFT size (number of sub-carriers) can be increased proportionally to trade Doppler performance for a longer symbol period and cyclic prefix while maintaining the basic sampling frequency ($F_s$), number of resource blocks and the same physical layer Frame structure (e.g., Sub-Frame=1 ms; Frame=10 ms). This can enable a large cell SFN broadcast-only mode extension to LTE, with adequate Doppler performance in 500-600 MHz UHF broadcast band. It should be understood that the OFDM parameter values are exemplary.

When sub-carrier spacing is reduced, the symbol period and corresponding cyclic prefix become longer. The proportional reduction/increase is termed "scaling". Scaling factors of 12, 8, 6, 4, 3, and 2, for example, can be applied. As a result, sub-carrier spacing of 1.25, 1.875, 2.5, 3.75, 5.0, 7.5 kHz can be used with corresponding Doppler speeds of 225, 350, 450, 675, 800 and 1050 km/h, and with inter-site distances of 65, 43, 33, 22, 17 and 11 km, respectively, are possible. These parameters can be used to plan a large cell SFN broadcast overlay.

Figure 5:
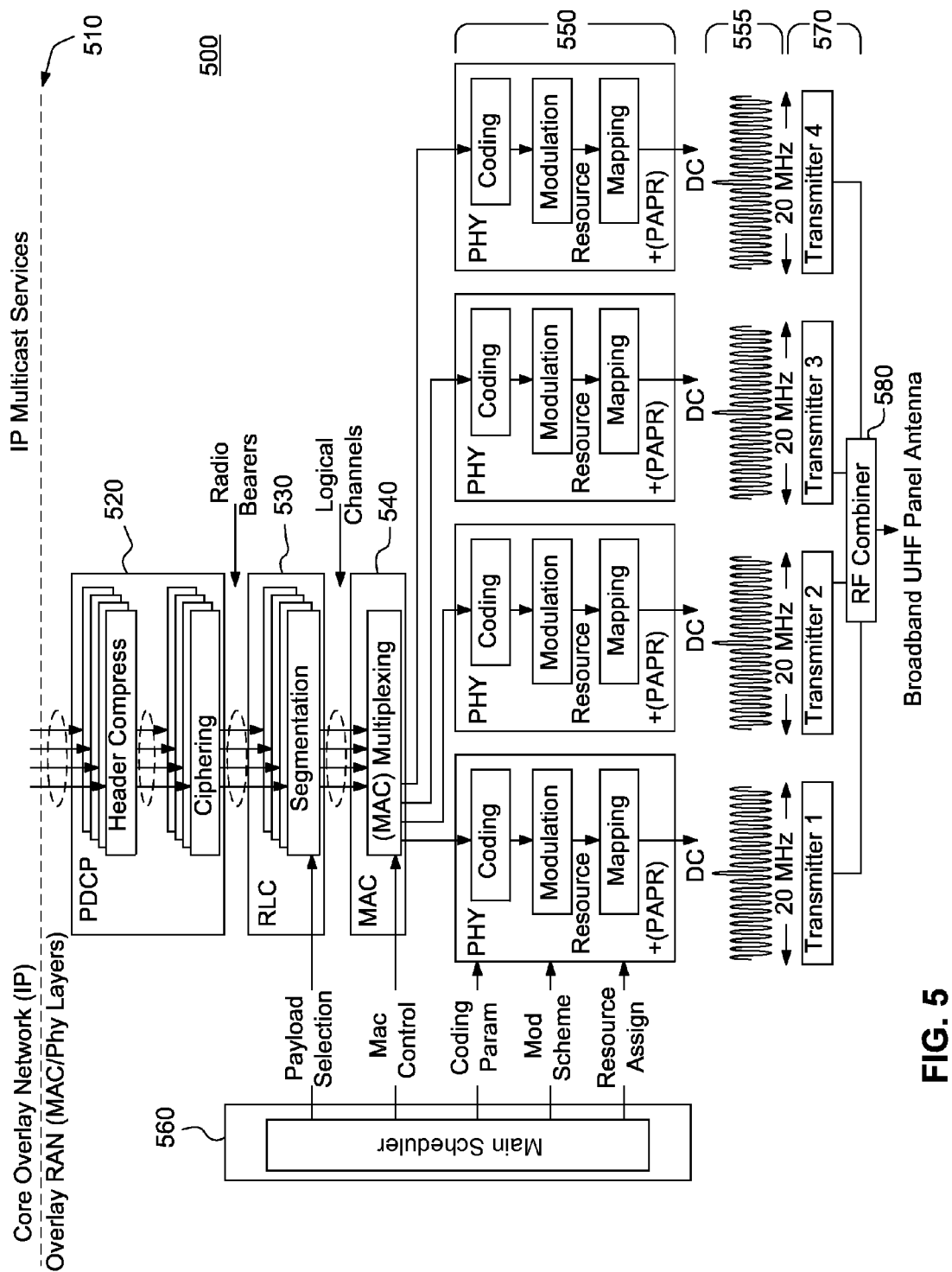
FIG. 5 illustrates an OFDMA RAN protocol architecture for a broadcast extension in accordance with an embodiment of the present invention.

FIG. 5 shows an exemplary RAN protocol architecture for a broadcast extension in accordance with one embodiment of the present invention. The demarcation line 510 at the top of FIG. 5 indicates IP user data traffic flows from EPC entering the broadcast RAN. There are four RAN protocol layers:

PDCP (Packet Data Convergence Protocol) 520—provides header compression and ciphering. One PDCP entity per Radio Bearer.

RLC (Radio-Link Control) 530—responsible for segmentation/concatenation, re-transmission, etc. Outputs logical channels.

MAC (Medium Access Control) 540—Multiplexing of logical channels, scheduling. Outputs a transport channel.

PHY (Physical layer) 550—performs channel coding (Turbo Encoder), modulation (QPSK, 16 QAM, 64 QAM) and mapping. Carrier aggregation (four—20 MHz OFDM carriers) is shown to create the broadband broadcast signal.

Scheduler 560—provides the controls for payload selection, MAC control, coding and modulation parameter selection and resource block assignment across the four-20 MHz OFDM aggregated carriers.

Four—20 MHz OFDM carriers 555 are shown being amplified by transmitters 570 and RF combined 580 into a high power broadband broadcast signal.

A basic LTE Frame can include 10 (1 ms) sub-frames (0, 1, 2, . . . , 9). In the mixed MBSFN mode, time division multiplexing of synchronized MBSFN broadcast sub-frames and unicast sub-frames can be specified with, for example, a 60/40 mix. Sub-frame #0 is unicast and contains the Primary/Secondary Synch Signals (PSS/SSS). A UE wishing to access any LTE cell first performs a cell search procedure by first locating the PSS/SSS (appearing every 5 ms) to achieve time and frequency synchronization; the PSS/SSS also contain other pertinent information such as cell ID and cyclic prefix length, etc. Next the UE decodes Physical Broadcast Channel (PBCH) which appears every 10 ms and contains other system information. Both the PSS/SS and PBCH are located in a unicast sub-frame.

In one embodiment, similar functionality is carried in broadcast sub-frames, particularly in the proposed LTE broadcast extension which is an LTE frame comprised of only broadcast sub-frames using the OFDM parameters described above.

In the physical layer, a modification of the resource mapping is shown to enable Peak to Average Power Reduction (PAPR) for the high power amplifiers used in a broadcast overlay. Also, mapping of optimized reference or sounding signals for SFN operation are used to enable UE to effectively estimate the channel using these known sub-carrier patterns.

An LTE-Advanced feature called "carrier aggregation" is a method for using spectrum to meet the high broadband data capacity requirements in future networks. 3GPP LTE-Advanced allows a maximum of up to (5) 20 MHz BW component carriers to be aggregated into an effective 100 MHz broadband block as an upper limit from a 3GPP perspective.

In one embodiment, broadcasters can aggregate (4) 20 MHz BW blocks of portions, the UHF broadcast band (channels 38-51 reframing, for example), in a spectrum-sharing paradigm under the broadcast overlay topology discussed above. This facilitates the efficient use of the currently fragmented and purposely unused spectrum (i.e., old topology) in major cities to create new business models and innovative types of broadcast services for consumers and help mitigate capacity for certain forecasted traffic types.

As shown in FIG. 5, there are common PDCP, RLC and MAC layer entities and each OFDM component carrier has a separate physical layer and scheduler. Several SFN broadcast transmission sites can share in this broadcast spectrum overlay topology, for example, with a inter-site distance of ~30 km. With this inter-site distance, as an example, it would be appropriate to use the OFDM parameters defined above with a sub-carrier spacing of 2.5 kHz.

In one exemplary embodiment, all broadcast television spectrum stakeholders have pooled their spectrum resources, thereby creating a continuous block of spectrum in, for example, a major city, such as 80 MHz in the UHF broadcast band. In this embodiment, a regulator sets policies and rules for use of shared spectrum, and that those constraints are reflected in the software running on the policy controller (FIG. 4, 420) along with the service level agreements (SLA) among entities.

A licensed spectrum-sharing database (FIG. 4, 418) can be used to contain attributes of the spectrum in play, to maximize spectrum efficiency and minimize interference in other geographic regions controlling parameters at each broadcast site as described above. According to one aspect, an SLA has been made and some dedicated digital BW (bps) is provisioned to both broadcasters and MNOs, along with some shared pooled (bps) which can be can be negotiated and dynamically assigned under rules specified. In this example, a fixed capacity has been set for the broadcaster and that contracted to a MNO with dynamic sharing of available bandwidth as business terms have defined.

Figure 6:
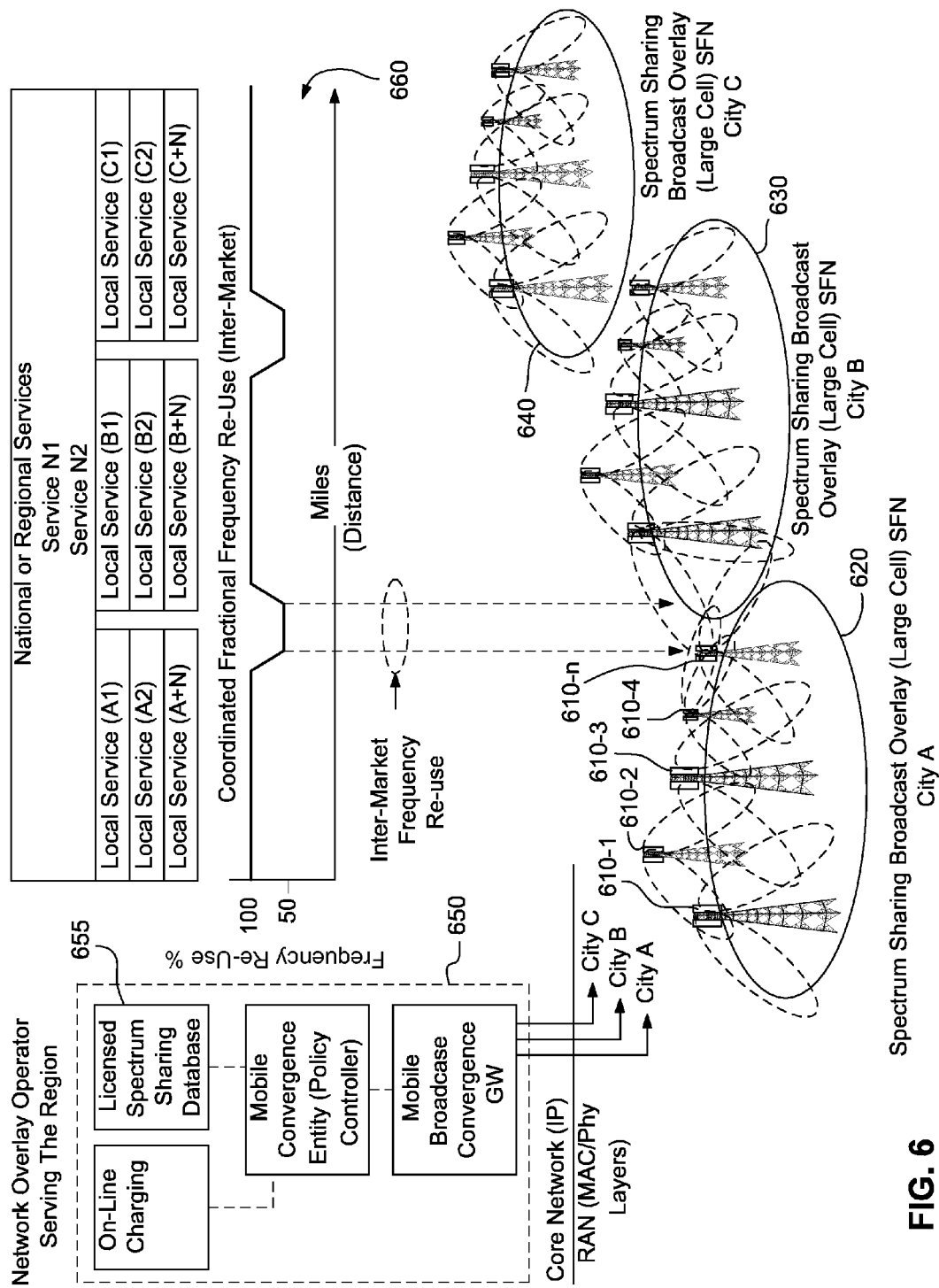
FIG. 6 illustrates database fractional frequency re-use in accordance with an exemplary embodiment of the present invention.

FIG. 6 shows database-controlled fractional frequency re-use in accordance with an exemplary embodiment of the present invention. The database-controlled fractional frequency re-use is optimized for broadcast overlay using the topology discussed above with respect to FIG. 3.

In one example embodiment, multiple panel antennas 610-1, . . . , 610-n at a site are fed by a common transmission line (not shown) where power is divided at the top of tower to each panel. A site on the edge between markets can use sectorized panel antennas each using an independent transmission line from a transmitter. The example shown in FIG. 6 shows OFDMA technology being provisioned for independent local broadcast services in each major city market (620, 630, 640) along with common national or regional services spanning multiple cities.

The broadcast SFN topology permits the center broadcast sites in each market to re-use the same frequency bands to local (independent) broadcast service and common national or regional services over a major city and surrounding areas. In this example the frequency re-use is (4)×20 MHz in densely populated areas of each city. All site coordination is through the licensed spectrum-sharing database in core network shown. The database 655 reflects all OFDM component carriers, resource blocks, including site parameters and propagation metrics, etc. In the case of an (edge) inter-market site for example 610-4, 610-N, with sectorized antennas, an antenna sector can be pointed towards city (intra-market) to re-use the same frequency resources as sites in the center of a city because of the directionality of an antenna sector, while other antenna sectors pointed towards adjacent market(s) are coordinated with database 655 and have a re-use of, for example, 50% of the cells (i.e., frequency resources) in the center of the city. In one example, the percentage of frequency resources assigned could be 50%, where those frequency resources carry the regional or national services that span large distances (inter-market). The (edge) sites of an adjacent city (e.g., 630) with antenna sector pointing towards 620 can be assigned the same national or regional services on the same frequency resources, while having independent local services within the center of a city.

This basic concept is shown in plot of frequency re-use vs. distance 660, a 50% loss in capacity (edge) is coordinated to mitigate inter-market interference and provide unique service offerings in each city and spanning regional or national services.

In yet another embodiment, the resource could be shared in the time domain using OFDMA physical layer and resources. Thus, the frequency resource blocks can be partitioned and allocated either in the frequency domain or time domain.

In yet another embodiment of the present invention a different OFDM physical layer standard can be optimized for either fixed and or portable/nomadic service in the lower UHF and/or upper VHF broadcast bands could be designed using these same principles as discussed above with respect to mobile services.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

The example embodiments described above such as, for example, the systems and procedures depicted in FIGS. 4, 5 and 6, or any part(s) or function(s) thereof, may be implemented by using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary in any of the operations described herein. In other words, the operations may be completely implemented with machine operations. Useful machines for performing the operation of the example embodiments presented herein include general purpose digital computers or similar devices.

Figure 7:
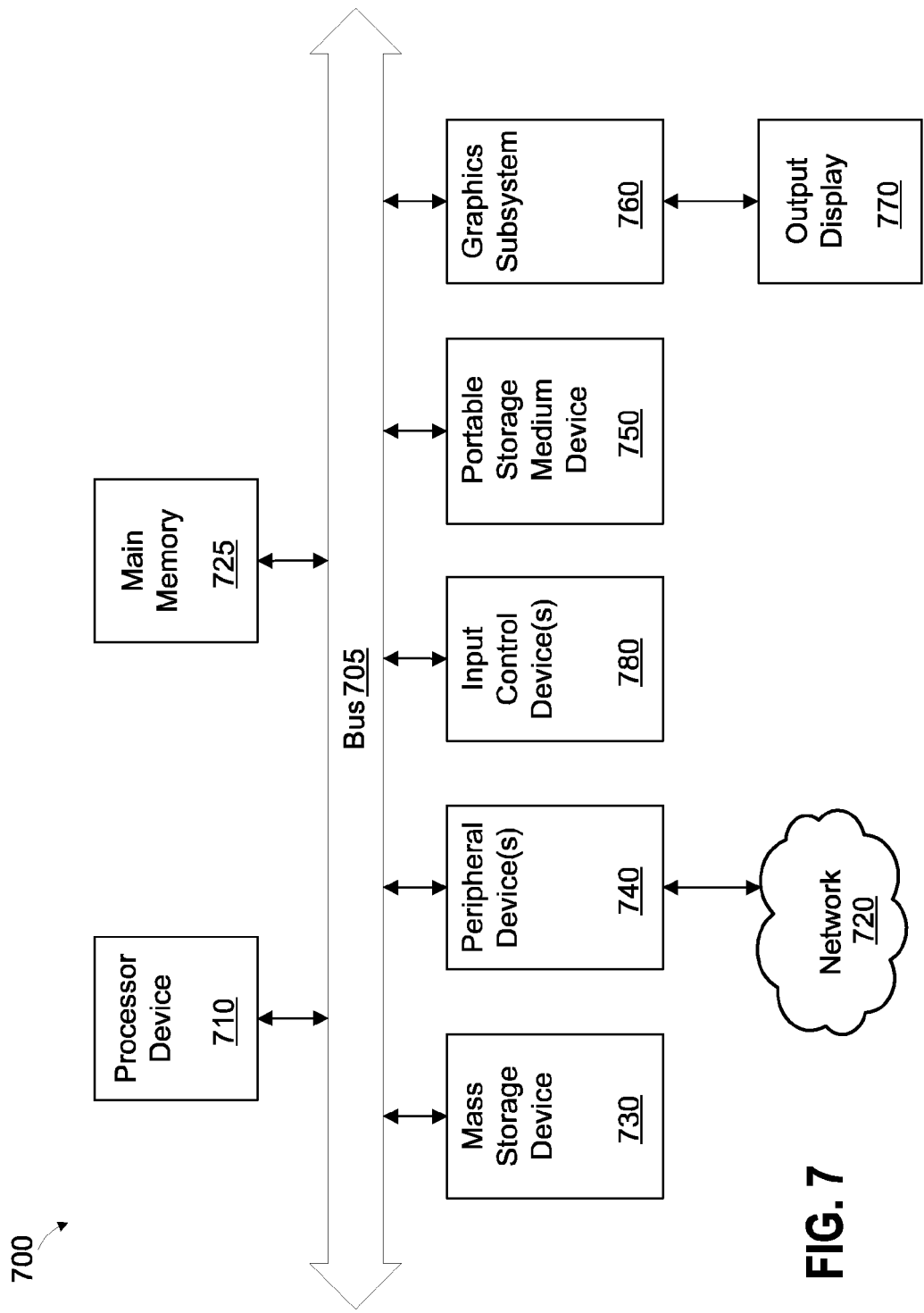
FIG. 7 is a block diagram of a general and/or special purpose computer system, in accordance with some embodiments.

FIG. 7 is a high-level block diagram of a general and/or special purpose computer system 700, in accordance with some embodiments. The computer system 700 may be, for example, a user device, a user computer, a client computer and/or a server computer, among other things.

The computer system 700 preferably includes without limitation a processor device 710, a main memory 725, and an interconnect bus 705. The processor device 710 may include without limitation a single microprocessor, or may include a plurality of microprocessors for configuring the computer system 700 as a multiprocessor system. The main memory 725 stores, among other things, instructions and/or data for execution by the processor device 710. If the system is partially implemented in software, the main memory 725 stores the executable code when in operation. The main memory 725 may include banks of dynamic random access memory (DRAM), as well as cache memory.

The computer system 700 may further include a mass storage device 730, peripheral device(s) 740, portable storage medium device(s) 750, input control device(s) 780, a graphics subsystem 760, and/or an output display 770. For explanatory purposes, all components in the computer system 700 are shown in FIG. 7 as being coupled via the bus 705. However, the computer system 700 is not so limited. Devices of the computer system 700 may be coupled through one or more data transport means. For example, the processor device 710 and/or the main memory 725 may be coupled via a local microprocessor bus. The mass storage device 730, peripheral device(s) 740, portable storage medium device(s) 750, and/or graphics subsystem 760 may be coupled via one or more input/output (I/O) buses. The mass storage device 730 is preferably a nonvolatile storage device for storing data and/or instructions for use by the processor device 710. The mass storage device 730 may be implemented, for example, with a magnetic disk drive or an optical disk drive. In a software embodiment, the mass storage device 730 is preferably configured for loading contents of the mass storage device 730 into the main memory 725.

The portable storage medium device 750 operates in conjunction with a nonvolatile portable storage medium, such as, for example, a compact disc read only memory (CD ROM), to input and output data and code to and from the computer system 700. In some embodiments, the software for storing an internal identifier in metadata may be stored on a portable storage medium, and may be inputted into the computer system 700 via the portable storage medium device 750. The peripheral device(s) 740 may include any type of computer support device, such as, for example, an input/output (I/O) interface configured to add additional functionality to the computer system 700. For example, the peripheral device(s) 740 may include a network interface card for interfacing the computer system 700 with a network 720.

The input control device(s) 780 provide a portion of the user interface for a user of the computer system 700. The input control device(s) 780 may include a keypad and/or a cursor control device. The keypad may be configured for inputting alphanumeric and/or other key information. The cursor control device may include, for example, a mouse, a trackball, a stylus, and/or cursor direction keys. In order to display textual and graphical information, the computer system 700 preferably includes the graphics subsystem 760 and the output display 770. The output display 770 may include a cathode ray tube (CRT) display and/or a liquid crystal display (LCD). The graphics subsystem 760 receives textual and graphical information, and processes the information for output to the output display 770.

Each component of the computer system 700 may represent a broad category of a computer component of a general and/or special purpose computer. Components of the computer system 700 are not limited to the specific implementations provided here.

Portions of the invention may be conveniently implemented by using a conventional general purpose computer, a specialized digital computer and/or a microprocessor programmed according to the teachings of the present disclosure, as will be apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the processes of the invention. The storage medium may include without limitation a floppy disk, a mini disk, an optical disc, a Blu-ray Disc, a DVD, a CD-ROM, a micro drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the invention. Such software may include without limitation device drivers, operating systems, and user applications. Ultimately, such computer readable media further include software for performing aspects of the invention, as described above.

Included in the programming and/or software of the general and/or special purpose computer or microprocessor are software modules for implementing the processes described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system for providing broadband broadcast sharing, comprising:
   a spectrum-sharing database operable to store attributes associated with a shared spectrum;
   a policy controller operable to control access to the shared spectrum by a plurality of broadcast service entities; and
   a gateway operable to receive IP multicast traffic from the plurality of broadcast service entities and to communicate the IP multicast traffic to a broadcast single frequency network,
   wherein the policy controller controls access to the spectrum based on a service level agreement between the broadcast service entities,
   wherein the broadcast single frequency network uses multiple transmit antennas with vertical beam tilt, and
   wherein the plurality of broadcast service entities are local television broadcast stations and wireless networks using the broadcast single frequency network as a shared point-to-multipoint broadcast infrastructure.

2. The system according to claim 1, wherein the policy controller is in communication with a policy charging enforcement function entity, and controls access to the shared spectrum based on a request from the policy charging enforcement function entity to use a portion of the shared spectrum.

3. The system according to claim 1, wherein the policy controller stores instructions which when executed by a processor of the policy controller cause the policy controller to control access to the shared spectrum by the plurality of broadcast service entities.

4. The system according to claim 1, wherein the gateway is further operable to aggregate the IP multicast traffic from the plurality of broadcast service entities to generate an aggregated IP multicast stream, and insert timing information into the aggregated IP multicast stream to cause modulators in a broadcast single frequency network to become synchronized.

5. The system according to claim 1, wherein the policy controller controls access to the spectrum based on at least one of a predetermined policy and government regulation.

6. The system according to claim 1, wherein the attributes stored in the spectrum-sharing database include at least one frequency band over a geographical area and at least one transmission parameter corresponding to the geographical area.

7. The system according to claim 1, further comprising:
   an on-line charging unit in communication with the policy controller, the on-line charging unit operable to monitor usage of the shared spectrum by at least one broadcast service entity and to communicate the usage to a billing system.

8. The system according to claim 1, wherein the gateway is further operable to perform deep packet inspection and monitor the IP multicast traffic from each broadcast service entity and communicate corresponding usage data to the policy controller.

9. The system according to claim 1, wherein the spectrum-sharing database is further operable to store frequency re-use data and wherein the policy controller mitigates inter-market interference by using the frequency re-use data.

10. The system according to claim 9, wherein the frequency re-use data includes frequency bands corresponding to respective geographic areas, which when processed by the policy controller, controls the allocation of frequency use between geographic areas.

11. The system according to claim 1, wherein broadcast service entities include at least one of a mobile broadcast service entities and a fixed broadcast service entities.

12. The system according to claim 1, wherein the mobile broadcast service entities use Orthogonal Frequency Division Multiple Access (OFDMA) and the fixed broadcast service entities use Orthogonal Frequency Division Multiplexing (OFDM).

13. A non-transitory computer-readable medium having stored thereon sequences of instructions, the sequences of instructions including instructions which when executed by a computer system causes the computer system to perform:
   storing, on a spectrum-sharing database, attributes associated with a shared spectrum;
   controlling access to the shared spectrum by a plurality of broadcast service entities;
   receiving IP multicast traffic from the plurality of broadcast service entities;

communicating the IP multicast traffic to a broadcast single frequency network; and controlling access to the shared spectrum by the plurality of broadcast service entities based on a service level agreement between the broadcast service entities, wherein the broadcast single frequency network uses multiple transmit antennas with vertical beam tilt, and wherein the plurality of broadcast service entities are local television broadcast stations and wireless networks using the broadcast single frequency network as a shared point-to-multipoint broadcast infrastructure.

14. The computer-readable medium of claim 13, further having stored thereon a sequence of instructions which when executed by the computer system causes the computer system to perform:

controlling access to the shared spectrum based on a request from a policy charging enforcement function entity to use a portion of the shared spectrum.

15. The computer-readable medium of claim 13, further having stored thereon a sequence of instructions which when executed by the computer system causes the computer system to perform:

aggregating the IP multicast traffic from the plurality of broadcast service entities to generate an aggregated IP multicast stream; and inserting timing information into the aggregated IP multicast stream to cause modulators in a broadcast single frequency network to become synchronized.

16. The computer-readable medium of claim 13, further having stored thereon a sequence of instructions which when executed by the computer system causes the computer system to perform:

controlling access to the spectrum based on at least one of a predetermined policy and government regulation.

17. The computer-readable medium of claim 13, wherein the attributes stored in the spectrum-sharing database include at least one frequency band over a geographical area and at least one transmission parameter corresponding to the geographical area.

18. The computer-readable medium of claim 13, further having stored thereon a sequence of instructions which when executed by the computer system causes the computer system to perform:

monitoring usage of the shared spectrum by at least one broadcast service entity; and communicating the usage to a billing system.

19. The computer-readable medium of claim 13, further having stored thereon a sequence of instructions which when executed by the computer system causes the computer system to perform:

deep packet inspection and monitoring of the IP multicast traffic from each broadcast service entity; and communicating corresponding usage data to a policy controller.

20. The computer-readable medium of claim 13, further having stored thereon a sequence of instructions which when executed by the computer system causes the computer system to perform:

storing frequency re-use data; and mitigating inter-market interference by using the frequency re-use data.

21. The computer-readable medium of claim 20, wherein the frequency re-use data includes frequency bands corresponding to respective geographic areas.

22. The computer-readable medium of claim 13, wherein broadcast service entities include at least one of a mobile broadcast service entities and a fixed broadcast service entities.

23. The computer-readable medium of claim 13, wherein the mobile broadcast service entities use Orthogonal Frequency Division Multiple Access (OFDMA) and the fixed broadcast service entities use Orthogonal Frequency Division Multiplexing (OFDM).

* * * * *

UNITED STATES PATENT AND TRADEMARK OFFICE
CERTIFICATE OF CORRECTION

PATENT NO. : 8,989,021 B2
APPLICATION NO. : 13/313417
DATED : March 24, 2015
INVENTOR(S) : Simon It is certified that error appears in the above-identified patent and that said Letters Patent is hereby corrected as shown below:

On the Title Page Item [56]

Page 3, Col. 1 Line 24-29

"Youping Zhao; Shiwen Mao; Reed, J.H.; Yingsong Huang, "Experimental study of utility function selection for video over IEEE 802.22 wireless regional area networks," Testbeds and Research Infrastructures for the Development of Networks & Communities and Workshops, 2009. TridentCom 2009. 5th International Conference on , vol., no., pp. 1, 10." should be deleted.

Page 3, Col. 1 Line 53-58

"Youping Zhao; Shiwen Mao; Reed, J.H.; Yingsong Huang, "Experimental study of utility function selection for video over IEEE 802.22 wireless regional area networks," Testbeds and Research Infrastructures for the Development of Networks & Communities & Workshops, 2009. TridentCom 2009. 5th International Conference vol., no., pp. 1, 10, Apr. 6-8, 2009." should be deleted.

Page 3, Col. 1 Line 59-64

"Youping Zhao et al., titled, "Experimental study of utility function selection for video over IEEE 802.22 wireless regional area networks" , Test beds and Research Infrastructures for the Development of Networks & Communities and Workshops, 2009, TridentCom-2009. 5th International Conference on , vol., no., pp. 1, 10, Apr. 6-8, 2009." should be deleted.

Signed and Sealed this
Eighth Day of September, 2015

Michelle K. Lee
*Director of the United States Patent and Trademark Office*

Page 3, Col. 1 Line 65-69

"Jen-Wen Ding et al., titled, "Quality-aware bandwidth allocation for scalable on-demand streaming in wireless networks," Selected Areas in Communications, IEEE Journal on, vol. 28, No. 3, pp. 366, 376, Apr. 2010." should be deleted.

In the Specification

COLUMN 3

Line 1, "controls" should read -- control --.

COLUMN 4

Line 3, "ground." should read -- ground, --.

COLUMN 8

Line 5, "a" should be deleted.
Line 23, "allow" should read -- allows --.

COLUMN 10

Line 14, "a" should read -- an --.
Line 34, "can be" (second occurrence) should be deleted.

In the Claims

COLUMN 14

Line 48, Claim 10, "controls" should read -- control --.
Line 61, Claim 13, "causes" should read -- cause --.